US012747855B1

(12) United States Patent
doust

(10) Patent No.: US 12,747,855 B1
(45) Date of Patent: Sep. 29, 2026

(54) CYLINDRICAL LIGHT FIXTURE

(71) Applicant: Hamid rashidi doust, Commerce, CA (US)

(72) Inventor: Hamid rashidi doust, Commerce, CA (US)

( * ) Notice: Subject to any disclaimer, the term of this patent is extended or adjusted under 35 U.S.C. 154(b) by 0 days.

(21) Appl. No.: 19/271,552

(22) Filed: Jul. 16, 2025

Related U.S. Application Data

(63) Continuation-in-part of application No. 30/010,647, filed on Jun. 28, 2025.

(51) Int. Cl.
*F21V 29/76* (2015.01)
*F21S 8/02* (2006.01)
(Continued)

(52) U.S. Cl.
CPC ............ *F21V 29/763* (2015.01); *F21S 8/026* (2013.01); *F21V 19/0035* (2013.01); *F21V 21/041* (2013.01); *F21V 23/003* (2013.01); *F21V 29/503* (2015.01); *F21V 29/83* (2015.01); *F21V 7/041* (2013.01); *F21V 17/12* (2013.01); *F21V 19/0055* (2013.01); *F21V 21/04* (2013.01); *F21V 21/042* (2013.01);
(Continued)

(58) Field of Classification Search
CPC ...... F21V 29/503; F21V 29/508; F21V 29/60; F21V 29/67; F21V 29/673; F21V 29/677; F21V 29/74; F21V 29/745; F21V 29/75; F21V 29/76; F21V 29/763; F21V 29/767; F21V 29/77; F21V 29/773; F21V 29/777; F21V 29/78; F21V 29/80; F21V 29/81; F21V 23/005; F21V 23/006; F21V 23/007; F21V 23/009; F21V 19/0035; F21V 19/0055; F21V 17/12; F21V 21/04; F21V 21/041; F21V 21/042; F21V 21/043; F21V 21/044; F21V 21/045; F21V 21/046; F21V 21/047; F21V 21/048; F21V 21/049
See application file for complete search history.

(56) References Cited

U.S. PATENT DOCUMENTS

| | | | | |
|---|---|---|---|---|
| 8,403,541 B1 * | 3/2013 | Rashidi | F21S 8/026 | 362/249.02 |
| 2009/0296414 A1 * | 12/2009 | Moriyama | F21V 29/74 | 362/373 |

(Continued)

FOREIGN PATENT DOCUMENTS

| | | | |
|---|---|---|---|
| CA | 3010273 C * | 2/2021 | F21V 29/773 |
| CN | 111520677 A * | 8/2020 | F21V 29/74 |

OTHER PUBLICATIONS

Machine translation of CN 111520677 A retrieved from the FIT database of PE2E search. (Year: 2026).*

*Primary Examiner* — Colin J Cattanach
(74) *Attorney, Agent, or Firm* — Payam Moradian

(57) ABSTRACT

Provided is a cylindrical light fixture comprising: a heat sink with a circular body and fins inside of the body; a driver placed above or below the fins of the heat sink, inside of the circular body; an LED light source placed below the fins of the heat sink; an LED holder attached to a bottom of the heat sink to keep the LED in place; an optic placed below the LED light source to direct light generated by the LED light source; and a holder attached to the heat sink to keep the optic in place; wherein the light fixture is in shape of a cylinder with a uniform diameter.

16 Claims, 14 Drawing Sheets

(51) Int. Cl.

| | |
|---|---|
| ***F21V 7/04*** | (2006.01) |
| ***F21V 17/12*** | (2006.01) |
| ***F21V 19/00*** | (2006.01) |
| ***F21V 21/04*** | (2006.01) |
| ***F21V 23/00*** | (2015.01) |
| ***F21V 29/503*** | (2015.01) |
| ***F21V 29/83*** | (2015.01) |
| ***F21Y 115/10*** | (2016.01) |

(52) U.S. Cl.
CPC ........... *F21V 21/043* (2013.01); *F21V 21/044* (2013.01); *F21V 21/045* (2013.01); *F21V 21/046* (2013.01); *F21V 21/047* (2013.01); *F21V 21/048* (2013.01); *F21V 21/049* (2013.01); *F21V 23/005* (2013.01); *F21V 23/006* (2013.01); *F21V 23/007* (2013.01); *F21V 23/009* (2013.01); *F21Y 2115/10* (2016.08)

(56) References Cited

U.S. PATENT DOCUMENTS

2011/0006680 A1* 1/2011 Tanaka .................... F21V 23/06 315/35
2022/0364716 A1* 11/2022 Hawkins ............... F21V 23/006

* cited by examiner

CYLINDRICAL LIGHT FIXTURE

CROSS-REFERENCE

The present application claims the benefit the application Ser. No. 30/010,647, filed on Jun. 28, 2025, which is incorporated herein by reference in its entirety.

BACKGROUND SECTION OF THE INVENTION

There is a need in the art for cylindrical light fixtures having a heat sink. The existing light fixtures lack a uniform size and are not sufficiently adaptable for attachment to a trim in the ceiling.

SUMMARY SECTION OF THE INVENTION

Provided is a cylindrical light fixture comprising: a heat sink with a circular body and fins inside of the body; a driver placed above the fins of the heat sink, inside of the circular body; an LED light source placed below the fins of the heat sink; an LED holder attached to a bottom of the heat sink to keep the LED in place; an optic placed below the LED light source to direct light generated by the LED light source; and a holder attached to the heat sink to keep the optic in place; wherein the light fixture is in shape of a cylinder with a uniform diameter. The heat sink can have a gap for flow of air. The heat sink can have a solid cylindrical portion below the fins, the solid cylindrical portion forming a portion of the outer uniform diameter of the light fixture. The heat sink can have a lower ring portion with threading on inside, the threading configured to attach to the holder. The holder can have a first portion with threading to attach to the heat sink, and second portion with threading, below the first portion, to attach to a trim. The first portion of the holder can be configured to attach to the heat sink has a smaller diameter than the lower portion of the holder configured to attach to a trim. The heat sink can have a cylindrical body with fins inside of the body and a solid cylindrical portion below the fins, the solid cylindrical portion aligning with the cylindrical body. The light fixture can further comprise a cap placed above the driver.

Provided is a cylindrical light fixture comprising: a heat sink with a circular body and fins inside of the body, the heat sink further comprising a solid cylinder below the heat sink, the outer portion of the solid cylinder aligning with the circular body, the heat sink having threading on an inside below the solid cylinder; a driver placed above or below the fins of the heat sink, inside of the circular body; an LED light source placed below the fins of the heat sink; an LED holder attached to a bottom of the solid cylinder to keep the LED light source in place; an optic placed below the LED light source to direct light generated by the LED light source; and a holder with threading on an outside, attached to the heat sink with the threading to keep the optic in place. The holder can have a first portion with threading to attach to the heat sink, and second portion with threading, below the first portion, to attach to a structure to secure the light fixture. The first portion of the holder can be configured to attach to the heat sink has a smaller diameter than the lower portion of the holder configured to attach to a trim. the driver can be placed above the heat sink. The driver can be placed below the heat sink and is incorporated into the LED holder. The driver can be placed below the heat sink. The light fixture can be in shape of a cylinder with a uniform diameter.

Provided is a cylindrical light fixture comprising: a heat sink with a circular body and fins inside of the body, the heat sink further comprising a solid cylinder below the heat sink, the outer portion of the solid cylinder aligning with the circular body, the heat sink having threading on an inside below the solid cylinder; a driver placed above or below the fins of the heat sink, inside of the circular body; an LED light source placed below the fins of the heat sink; an LED holder attached to a bottom of the solid cylinder to keep the LED light source in place; an optic placed below the LED light source to direct light generated by the LED light source; and a holder with two sets of threading on an outside, the first set of threading on top having a smaller diameter than a second set of threading on a bottom of the holder, the threading on top configured to attach to the threading of the heat sink. The driver can be placed above the heat sink. The driver can be placed below the heat sink and is incorporated into the LED source. The driver can be placed below the heat sink. The light fixture can be in shape of a cylinder with a uniform diameter.

DETAILED DESCRIPTION OF THE INVENTION

Provided is a cylindrical light fixture with a uniform diameter. The cylindrical light fixture has a heat sink 5 and a driver 6 that is placed above the heat sink 5. In another embodiment, the LED/driver 10 unit is placed below the heat sink 5.

Figure 1:
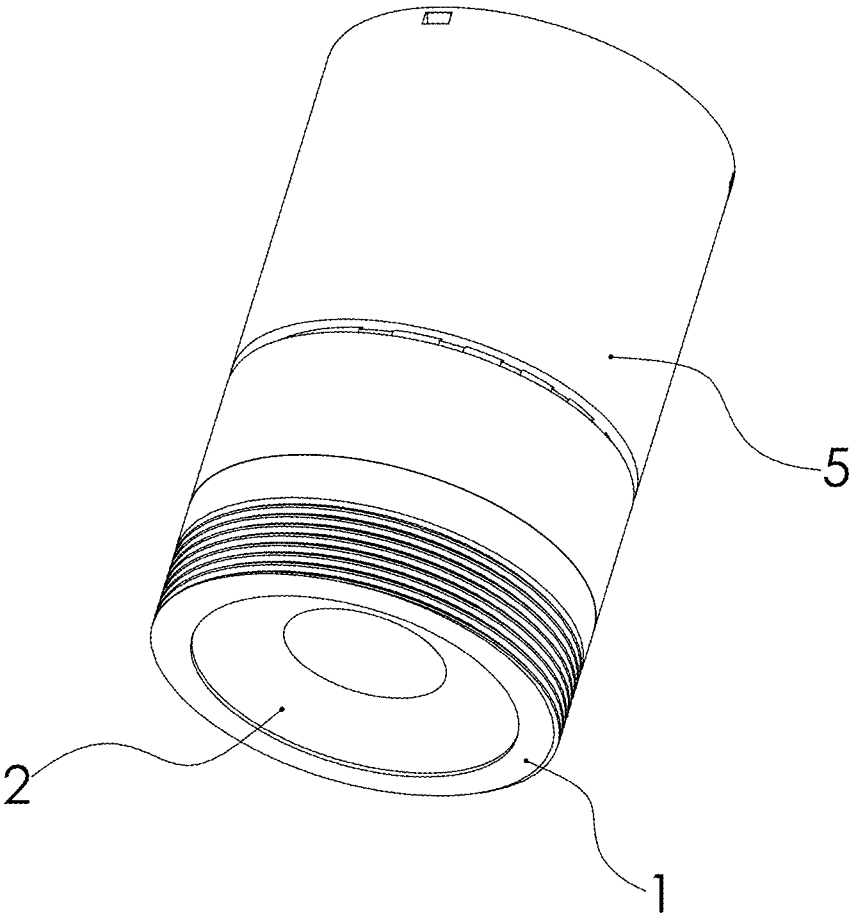
FIG. 1 is a bottom perspective view of a Cylindrical Light Fixture.

FIG. 1 illustrates then bottom perspective view of a Cylindrical Light Fixture. The circular body 5 is illustrated with a gap for flow of air formed between the upper and the lower circular body of heat sink 5. Heat sink 5 is typically made from aluminum.

Holder 1 is illustrated in the bottom and is attached to heat sink 5 with threading. Holder 1 keeps optics 2 in place.

Figure 2:
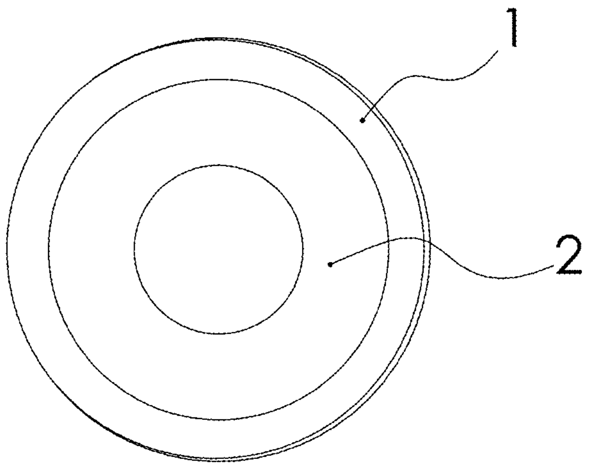
FIG. 2 is a bottom plan view of the Cylindrical Light Fixture.
Figure 3:
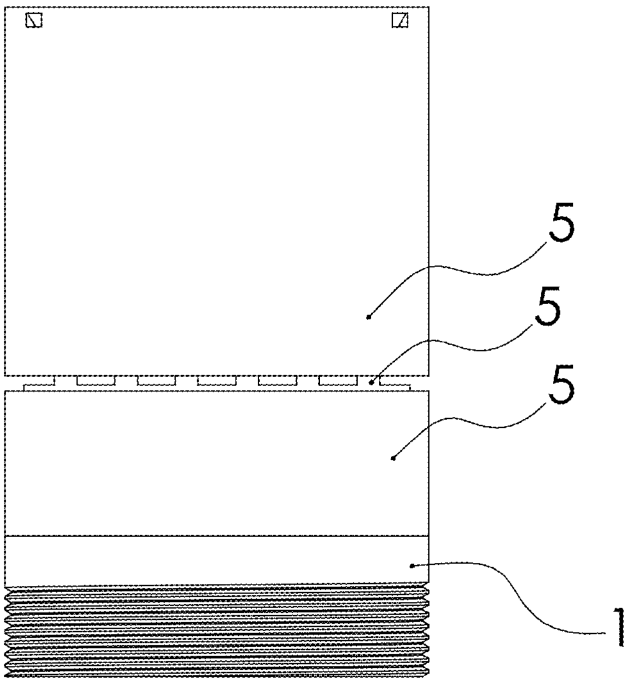
FIG. 3 is a left side view of the Cylindrical Light Fixture.
Figure 4:
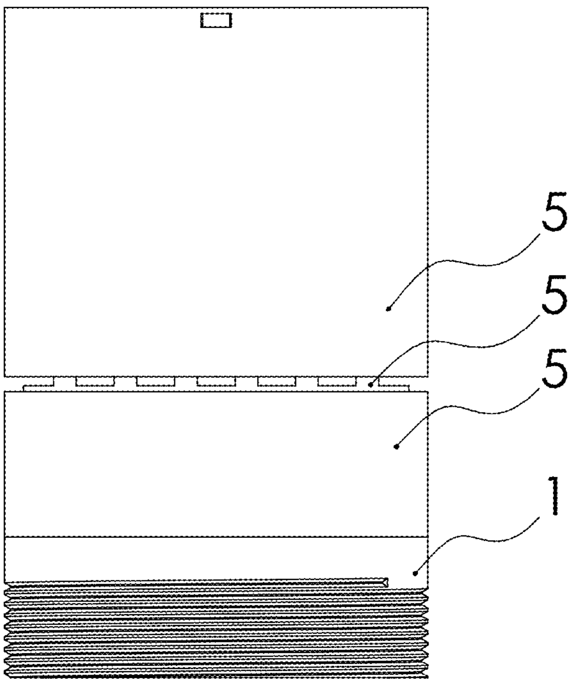
FIG. 4 is a right side view of the Cylindrical Light Fixture.
Figure 5:
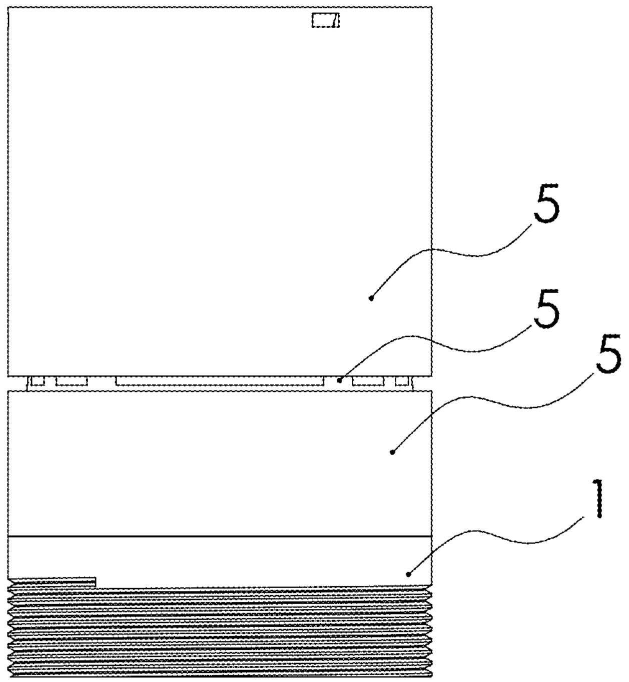
FIG. 5 is a front side view of the Cylindrical Light Fixture.
Figure 6:
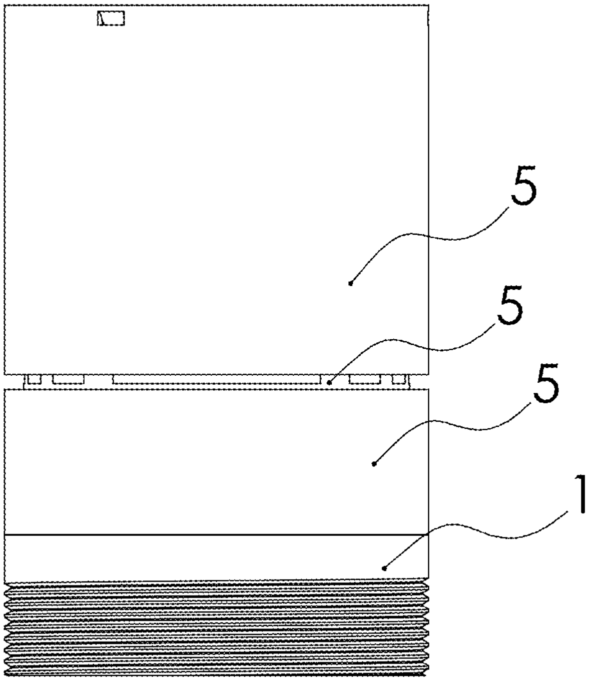
FIG. 6 is a rear side view of the Cylindrical Light Fixture.

FIG. 2 illustrates a bottom view the light fixture showing holder 1 and optics 2.

FIGS. 3, 4, 5, and 6 are side views of the light fixture. Fins of the heat sink 5 are visible from the air gap between the lower and the upper part of heat sink 5, which can be a one piece fabricated aluminum. Holder 1 is attached with inner threading to heat sink 5. Holder 1 has additional threading on the outside.

Figure 7:
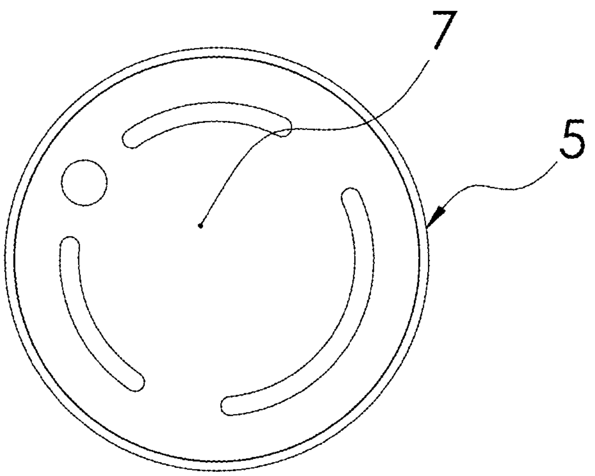
FIG. 7 is a top plan view of the Cylindrical Light Fixture.

FIG. 7 illustrates a top plan view of the light fixture. Illustrated in this view is cap 7 which sits on top of the circular body of heat sink 5. Cover 7 snaps into slots on the heat sink 5.

Figure 8:
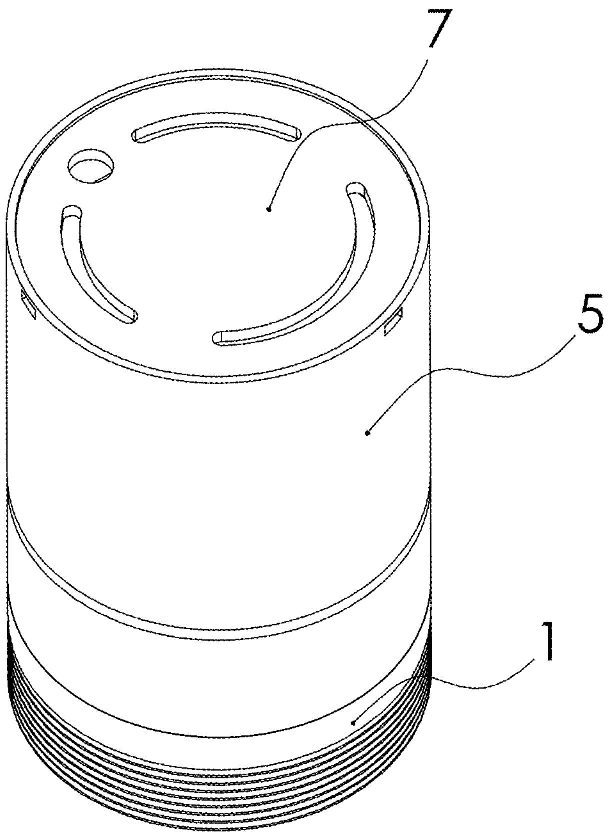
FIG. 8 is a top perspective view of the Cylindrical Light Fixture.

FIG. 8 illustrates a top perspective view of the light fixture. Illustrated in this view are cap 7 attached to the top of heat sink 5, and holder 1 attached to bottom of heat sink 5.

Figure 9:
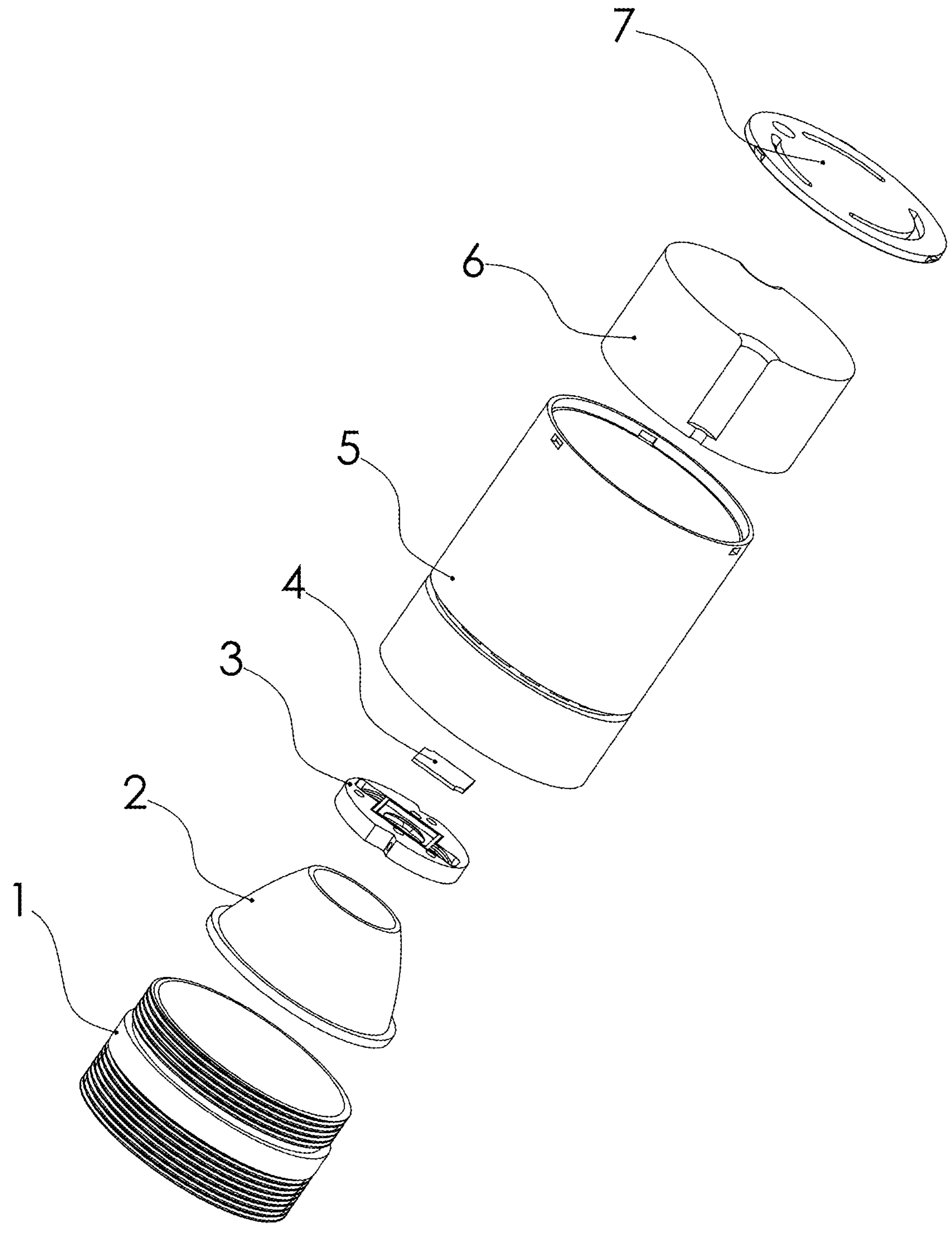
FIG. 9 is an exploded view of the Cylindrical Light Fixture.

FIG. 9 illustrates an exploded view of the light fixture. A driver 6 is placed inside of heat sink 5. Driver 6 can have a cylindrical housing that is concentric to the circular body of heat sink 5. The driver 6 can have a power management unit (PMU) and wiring to control flow of electricity (wattage, voltage) from an external power source. Driver 6 is placed inside heat sink 5, typically on the top of the heat dissipating fins that are inside of heat sink 5. Cap 7 can be placed on top of driver 6, and snap into the top of heat sink 5. The top of heat sink 5 can have one or more slots for securing cover 7.

An LED light source 4 (which can be made of plurality of LED light sources) is placed below the fins of heat sink 5. An LED Holder 3 is attached to the bottom of the heat sink 5, and holds the LED light source 4 in place.

An optic 2 is placed below the LED light source 4. The optic 2 can be conical in shape and have an opening all the way from through inside of the conical. The smaller opening on top of the reflector is placed around the LED source 4 of light. As illustrated, optic 2 also has an optic on the inside of the conical structure. The light produced by the LED light source 4 travels from top of the optic 2 to the bottom. Optic 2 has an outer edge on the bottom which can hold the optic 2 in place with holder 1.

Holder 1, which can be cylindrical, is removably attached to the heat sink 5 to keep the optic 2 place. Holder 1 can have a bottom inside edge all around in a horizontal direction to keep the optic 2 in place. The edge can be 0.1 mm to 0.3 mm in length, and be a disc that goes all around inside of the holder 1 in a concentric fashion.

Holder 1 can have one or two sets of threading on the outside. The threading on the outside of the holder 1 can attach in a complementary manner to the threading on the inside of the heat sink 8. As illustrated, the holder has two sets of threading, both sets of threating facing outwardly. The top set of threading has a smaller diameter compared to the lower set of threading. An outwardly edge between the top set of threading and the lower set of threading compensates for the different in dimeter. Holder 1 is configured in such manner that the top set of threading is placed inside of heat sink 5, the lower portion of the holder 1 aligns with the circular body of heat sink 5 so a fixture with a uniform diameter is obtained.

Figure 10:
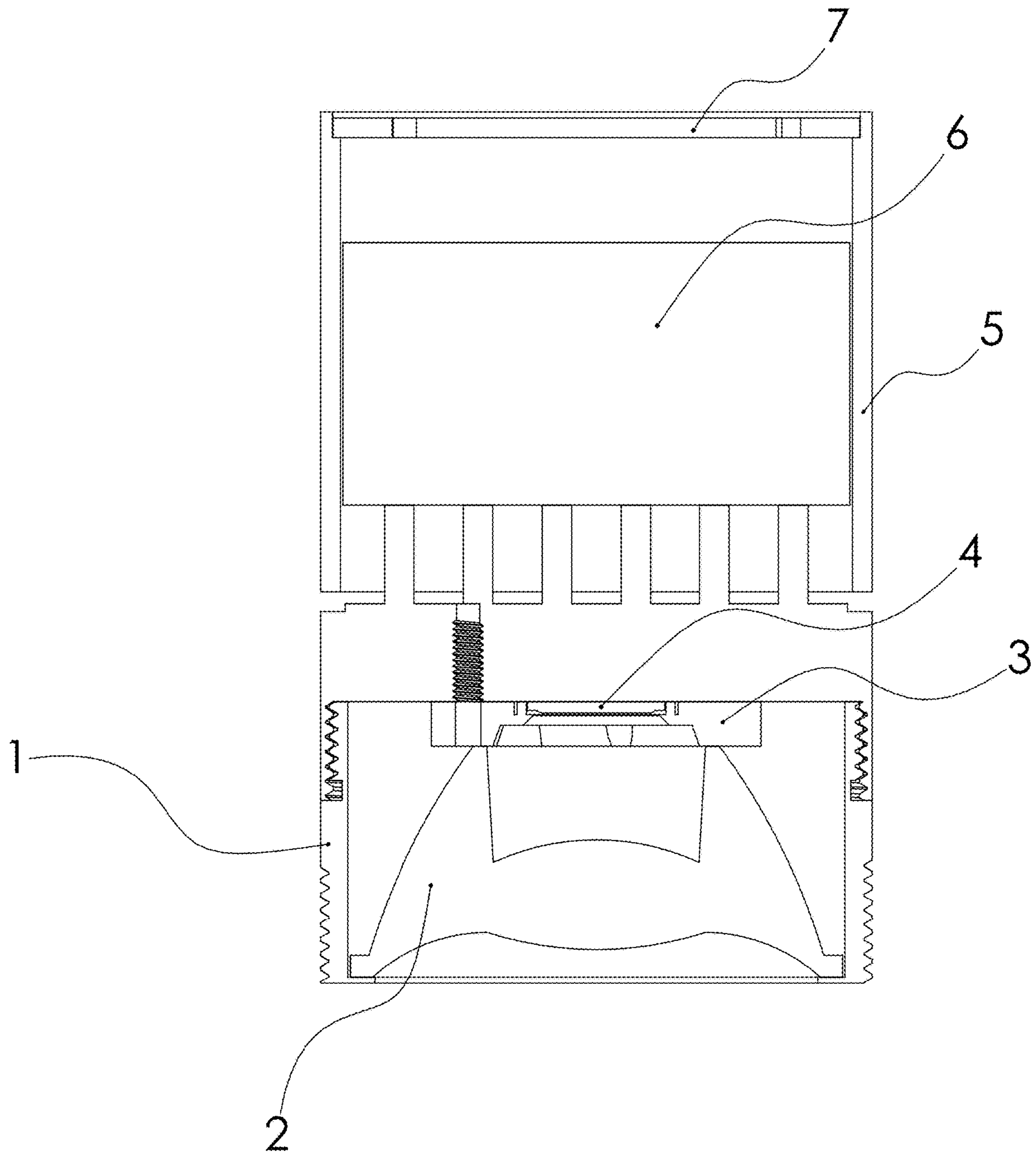
FIG. 10 is a side cut-off view of the Cylindrical Light Fixture.
Figure 11:
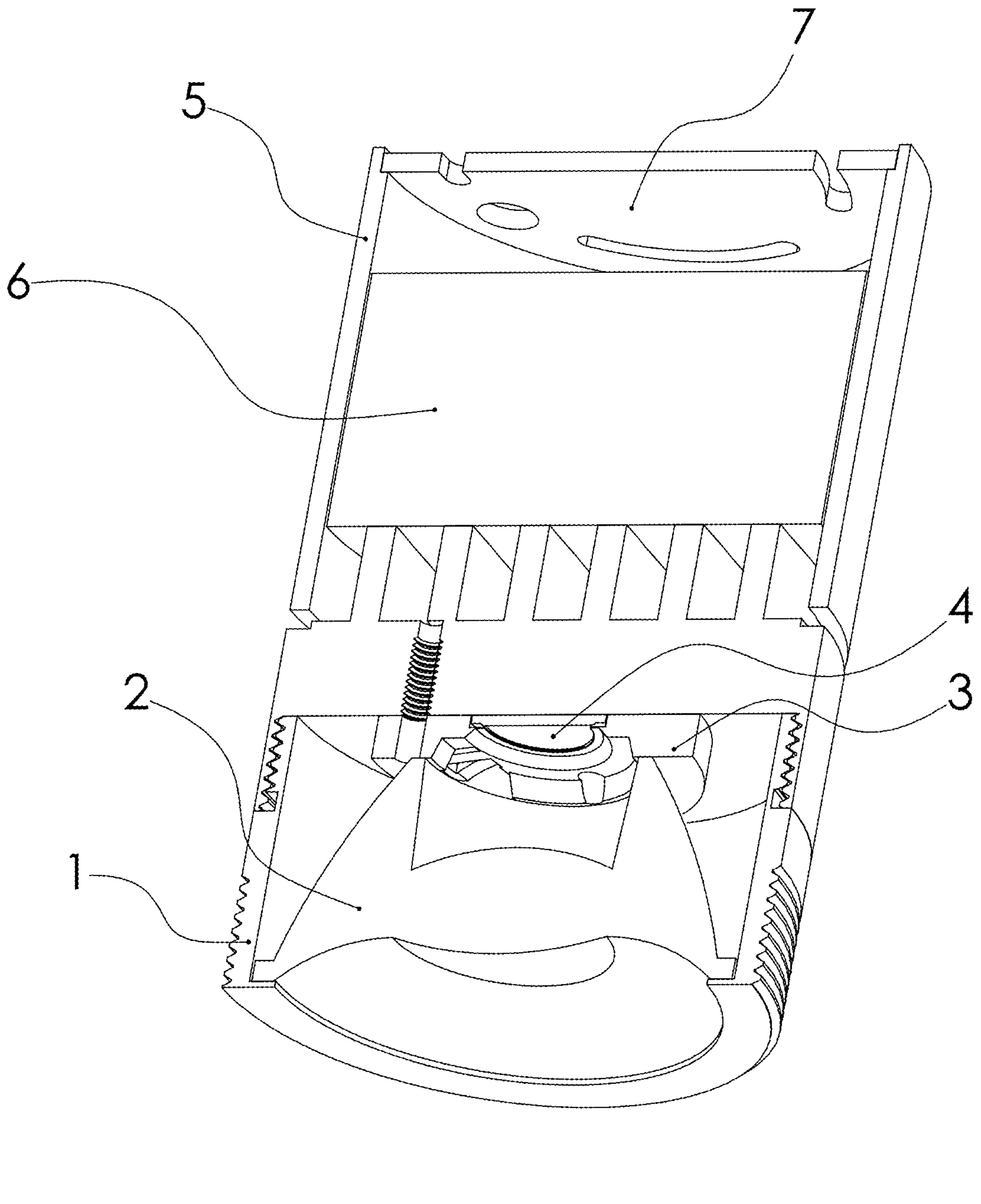
FIG. 11 is a perspective cut-off view of the Cylindrical Light Fixture.

FIGS. 10 and 11 illustrate a cut-off view of the light fixture. These figures illustrate heat sink 5 with three portions. An upper and a lower cylindrical/circular body, and a middle portion with heat dissipating fins and an air gap. Below the heat fins a solid cylinder can exist. LED holder 3 is attached to the solid cylinder with a plurality of fasteners, such as screws. LED holder 3 can be a disc with an opening inside to allow for placing LED 4 and passage of light. LED holder 3 can have a slot (area with lower thickness) with an opening for placement of LED 4. LED 4 is held against the bottom solid cylinder of the heat sink 5. Optic 2 is placed immediately below LED holder 3.

Figure 12:
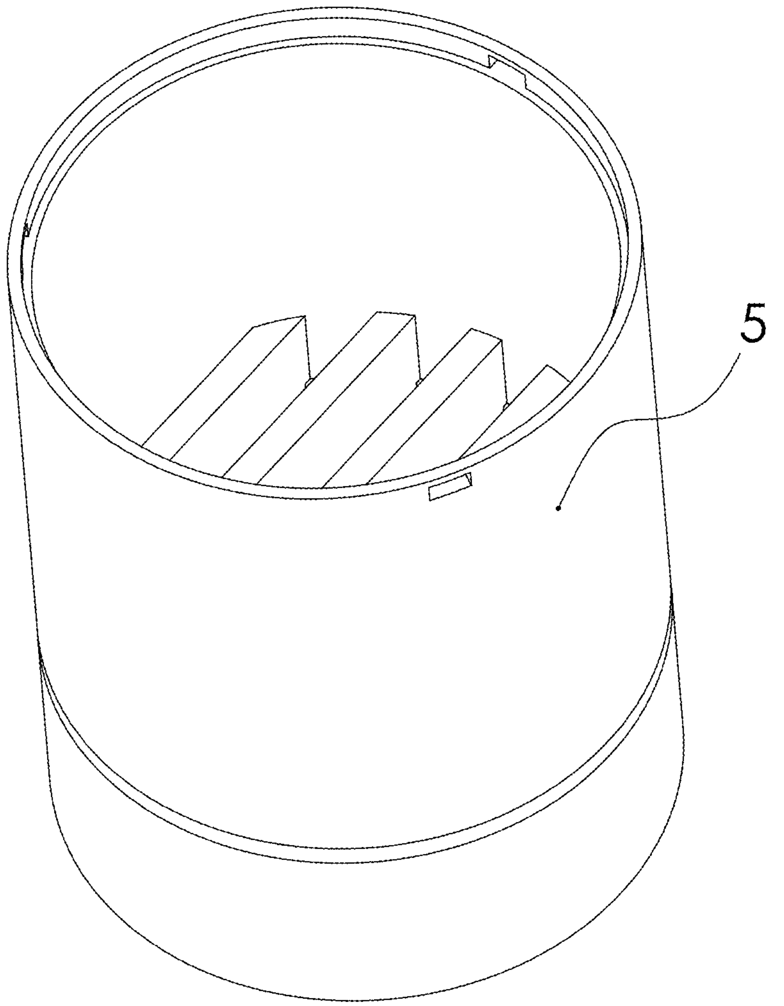
FIG. 12 is a perspective view of the heat sink.
Figure 13:
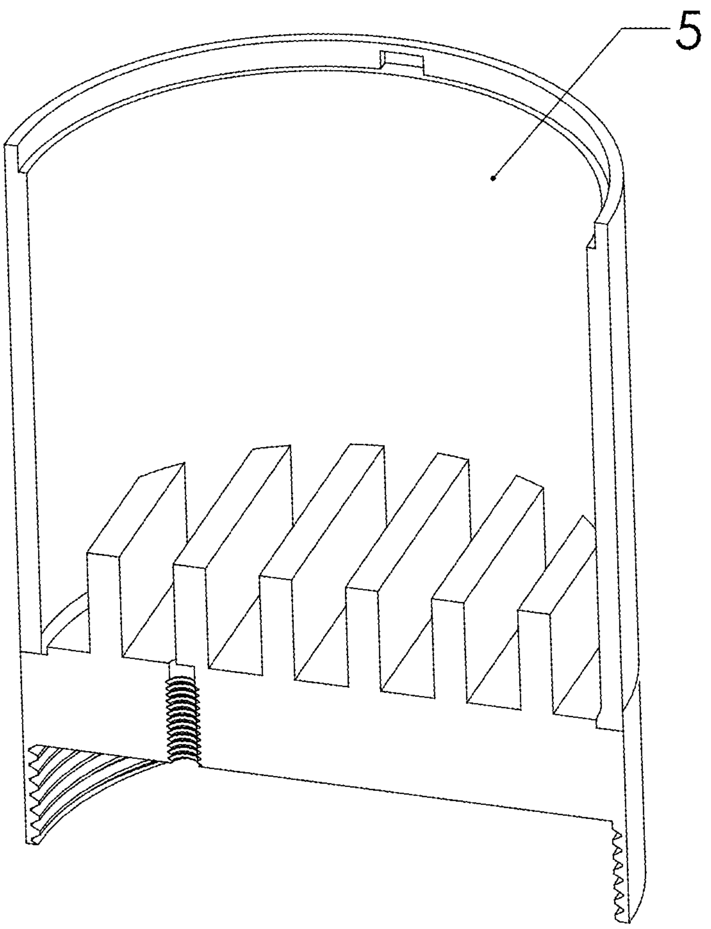
FIG. 13 is a cut-off view of the heat sink.

FIGS. 12 and 13 illustrate heat sink 5. Heat sink 5 can have fins on top of a solid cylinder. Heat sink 5 can have a further bottom portion under the cylinder in form of a ring with threading on the inside. The threading on the inside can be used for removable attachment to holder 1.

As illustrated, holder 1 can have three portions. The top portion can have external threading, the middle portion lacking threading, and the bottom portion having external threading. The diameter of the top portion can be less than the diameter of the bottom portion. The top portion is configured to attach to the threading on the inside of the bottom portion of the heat sink 5. The threading on the bottom portion of the holder 1 is configured to attach to a trim or other structure for installation to a ceiling.

Figure 14:
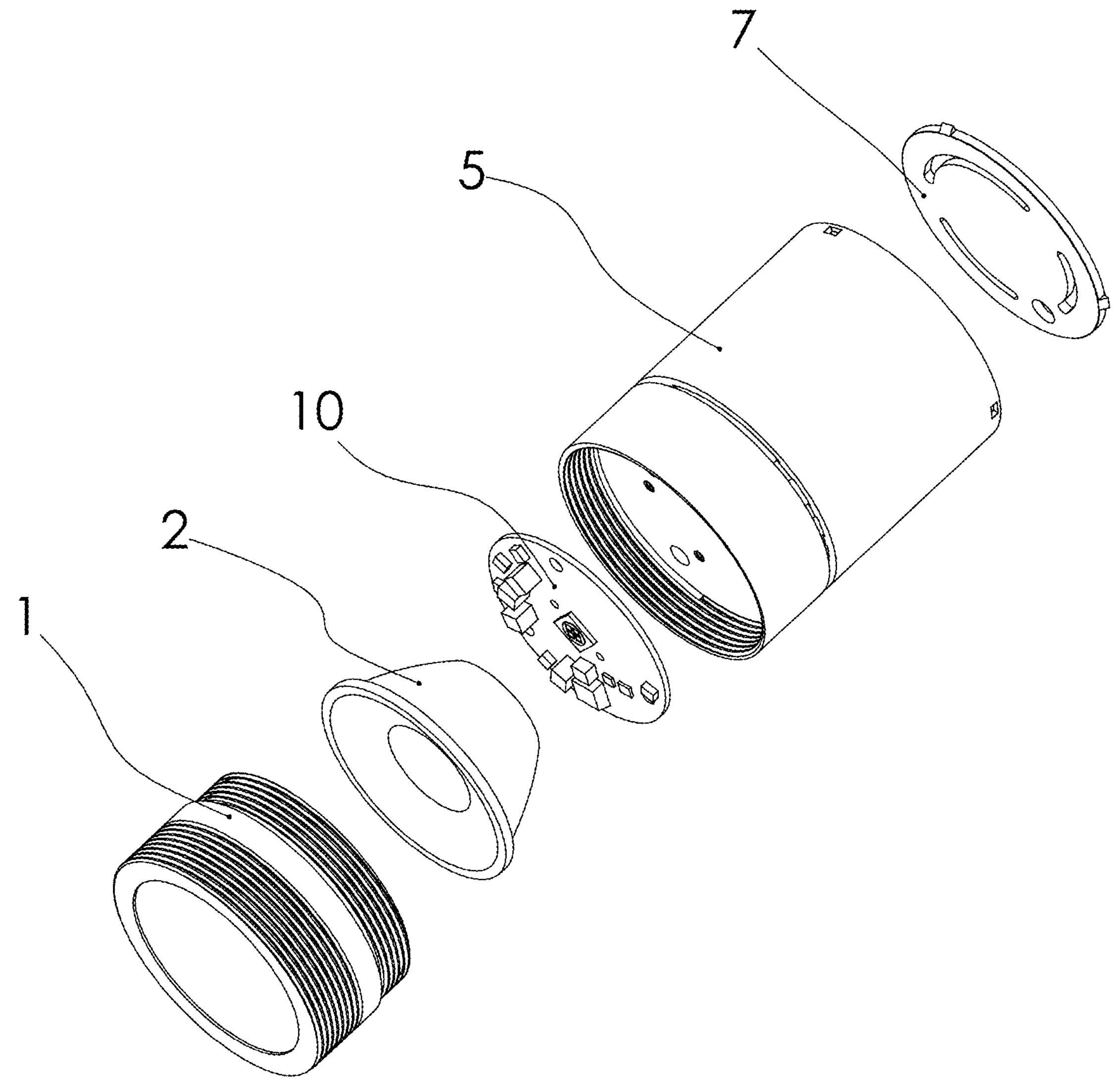
FIG. 14 is an exploded view showing an LED with a driver.

FIG. 14 illustrates an embodiment where a driver is placed below heat sink 5. The driver is incorporated into the LED/Driver 10 unit. In this embodiment, a driver above the heat sink 5 is lacking. The LED/driver 10 unit is placed below the heat sink 8 and attached to the heat sink 5. In this embodiment, the driver can be directly or indirectly attached to the heat sink 5. Heat sink 5 can be kept the same or shortened in height to compensate for lack of a driver above the heat sink 5.

1. Holder
2. Optic
3. LED holder
4. LED
5. Heat Sink
6. Driver
7. Cap
8. LED/Driver Unit

What is claimed is:

1. A cylindrical light fixture comprising:
a. a heat sink with a circular body and fins inside of the body;
b. a driver placed above the fins of the heat sink, inside of the circular body;
c. an LED light source placed below the fins of the heat sink;
d. an LED holder attached to a bottom of the heat sink to keep the LED in place;
e. an optic placed below the LED light source to direct light generated by the LED light source; and
f. a holder attached to the heat sink to keep the optic in place, the optic placed inside of the holder;
wherein the light fixture is in shape of a cylinder with a uniform diameter
wherein the holder has a first portion with threading to attach to the heat sink, and second portion with threading, below the first portion, to attach to a trim;
wherein the first portion of the holder configured to attach to the heat sink has a smaller diameter than the lower portion of the holder.

2. The cylindrical light fixture of claim 1, wherein the heat sink has a gap for flow of air.

3. The cylindrical light fixture of claim 1, wherein the heat sink has a solid cylindrical portion below the fins, the solid cylindrical portion forming a portion of a uniform diameter of the light fixture.

4. The cylindrical light fixture of claim 1, wherein the heat sink has a lower ring portion with threading on inside, the threading configured to attach to the holder.

5. The cylindrical light fixture of claim 1, wherein the heat sink has a cylindrical body with fins inside of the body and a solid cylindrical portion below the fins, the solid cylindrical portion aligning with the cylindrical body.

6. The cylindrical light fixture of claim 1, further comprising a cap placed above the driver.

7. A cylindrical light fixture comprising:
a. a heat sink with a circular body and fins inside of the body, the heat sink further comprising a solid cylinder below the heat sink, the outer portion of the solid cylinder aligning with the circular body, the heat sink having threading on an inside below the solid cylinder;

b. a driver placed above or below the fins of the heat sink, inside of the circular body;

c. an LED light source placed below the fins of the heat sink;

d. an LED holder attached to a bottom of the solid cylinder to keep the LED light source in place;

e. an optic placed below the LED light source to direct light generated by the LED light source; and f. a holder with threading on an outside, attached to the heat sink with the threading to keep the optic in place, wherein the holder has a first portion with threading to attach to the heat sink, and second portion with threading, below the first portion, wherein the first portion of the holder configured to attach to the heat sink has a smaller diameter than the lower portion of the holder configured to attach to a trim.

8. The cylindrical light fixture of claim 7, wherein the driver is placed above the heat sink.

9. The cylindrical light fixture of claim 7, wherein the driver is placed below the heat sink and is in a single unit with the LED light source.

10. The cylindrical light fixture of claim 7, wherein the driver is placed below the heat sink.

11. The cylindrical light fixture of claim 7, wherein the light fixture is in shape of a cylinder with a uniform diameter.

12. A cylindrical light fixture comprising:

a. a heat sink with a circular body and fins inside of the body, the heat sink further comprising a solid cylinder below the heat sink, the outer portion of the solid cylinder aligning with the circular body, the heat sink having threading on an inside below the solid cylinder;

b. a driver placed above or below the fins of the heat sink, inside of the circular body;

c. an LED light source placed below the fins of the heat sink;

d. an LED holder attached to a bottom of the solid cylinder to keep the LED light source in place;

e. an optic placed below the LED light source to direct light generated by the LED light source; and f. a holder with two sets of threading on an outside, the first set of threading on top having a smaller diameter than a second set of threading on a bottom of the holder, the optic placed inside of the holder.

13. The cylindrical light fixture of claim 12, wherein the driver is placed above the heat sink.

14. The cylindrical light fixture of claim 12, wherein the driver is placed below the heat sink and is incorporated into a unit with the LED light source.

15. The cylindrical light fixture of claim 12, wherein the driver is placed below the heat sink.

16. The cylindrical light fixture of claim 12, wherein the light fixture is in shape of a cylinder with a uniform diameter.

* * * * *